US012767750B2

(12) United States Patent
Zhao et al.

(10) Patent No.: US 12,767,750 B2
(45) Date of Patent: Oct. 20, 2026

(54) LIPOPHILIC POLYURETHANE ORGANOGELS

(71) Applicant: Massachusetts Institute of Technology, Cambridge, MA (US)

(72) Inventors: Xuanhe Zhao, Cambridge, MA (US); Xinyue Liu, Cambridge, MA (US); Xiaoyu Chen, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 661 days.

(21) Appl. No.: 18/302,697

(22) Filed: Apr. 18, 2023

(65) Prior Publication Data

US 2023/0331892 A1 Oct. 19, 2023

Related U.S. Application Data

(60) Provisional application No. 63/331,954, filed on Apr. 18, 2022.

(51) Int. Cl.

| | |
|---|---|
| ***C08F 283/00*** | (2006.01) |
| ***C08G 18/10*** | (2006.01) |
| ***C08G 18/28*** | (2006.01) |
| ***C08G 18/67*** | (2006.01) |
| ***C08G 18/76*** | (2006.01) |
| ***C08J 3/09*** | (2006.01) |
| ***C09D 5/16*** | (2006.01) |
| ***C09D 151/08*** | (2006.01) |
| ***C09D 175/04*** | (2006.01) |

(52) U.S. Cl.
CPC .......... *C08F 283/006* (2013.01); *C08G 18/10* (2013.01); *C08G 18/281* (2013.01); *C08G 18/288* (2013.01); *C08G 18/672* (2013.01); *C08G 18/7671* (2013.01); *C08J 3/092* (2013.01); *C09D 5/1637* (2013.01); *C09D 5/1662* (2013.01); *C09D 151/08* (2013.01); *C09D 175/04* (2013.01); *C08G 2220/00* (2013.01); *C08J 2351/00* (2013.01)

(58) Field of Classification Search
CPC ... C08F 283/006; C08G 18/10; C08G 18/281; C08G 18/288; C08G 18/672; C08G 18/7671; C08G 2220/00; C08J 3/092; C08J 2351/00; C09D 5/1637; C09D 151/08; C09D 5/1662; C09D 175/04
See application file for complete search history.

(56) References Cited

FOREIGN PATENT DOCUMENTS

JP 2017031426 A * 2/2017 .......... C08G 18/225

OTHER PUBLICATIONS

Machine English translation of JP 2017-031426, Holger et al., Feb. 9, 2017.*

* cited by examiner

*Primary Examiner* — Patrick D Niland
(74) *Attorney, Agent, or Firm* — McDonnell Boehnen Hulbert & Berghoff LLP

(57) ABSTRACT

This disclosure relates to modified polyurethanes, specifically polyurethanes modified with one or more lipophilic groups, and tough organogels comprising such modified polyurethanes.

22 Claims, 3 Drawing Sheets

Anti-fibrin deposition characterization

LIPOPHILIC POLYURETHANE ORGANOGELS

CROSS REFERENCE TO RELATED APPLICATIONS

This application claims priority to U.S. Provisional Patent Application No. 63/331,954, filed Apr. 18, 2022, the contents of which are hereby incorporated by reference in their entirety.

BACKGROUND OF THE DISCLOSURE

Field of the Disclosure

This disclosure relates to modified polyurethanes, specifically polyurethanes modified with one or more lipophilic groups, and tough organogels comprising such modified polyurethanes.

Description of Related Art

Polymer organogels and hydrogels are important materials for applications ranging from drug delivery, tissue engineering, medical implants, wound dressings, and contact lenses to sensors, actuators, electronic devices, optical devices, batteries, water harvesters, and soft robots. Whereas numerous hydrogels and organogels have been developed over the last few decades, there remains a need to develop novel organogel and hydrogel materials and fabrication methods for various applications.

Poly(ethylene glycol) (PEG) is the most common material used to combat biofouling (i.e., non-specific adsorption of cells, proteins and microorganisms) in implantable medical implants, biomedical devices, biosensors, and surgical tools. But PEG is prone to degradation and can provoke an adverse immune response. Several hydrogel materials, such as zwitterionic hydrogels, have been proposed as anti-fouling coatings for surfaces. But as PEG, they have degradation and immunogenic issues, and some were not effective in imparting resistance to cell and protein adsorption and/or preventing bacterial adhesion.

Thus, there is a need for new materials and approaches in biomedical and device applications as effective anti-biofouling coatings that are stable in vivo.

SUMMARY OF THE DISCLOSURE

One aspect of the disclosure provides a modified polyurethane (PU). Such polyurethane includes one or more lipophilic groups attached to the polyurethane, optionally through a linker, at a carbamate moiety of the polyurethane.

In another aspect, the disclosure also provides an organogel including a polymer component and an organic solvent, the polymer component including a modified polyurethane of the disclosure as described herein.

The organogels of the disclosure are suitable for anti-biofouling applications. Thus, another aspect of the disclosure includes a coating comprising an organogel of the disclosure as described herein. In certain embodiments, the coating is for use in coating surfaces of a medical device or sensor, for example, wherein the coating prevents, inhibits, or reduces biofouling.

The disclosure also provides a method of preventing, inhibiting, or reducing biofouling in a medical device or sensor. Such method includes applying a coating of the disclosure as described herein to the surface of the medical device or sensor.

These and other features and advantages of the present invention will be more fully understood from the following detailed description taken together with the accompanying claims. It is noted that the scope of the claims is defined by the recitations therein and not by the specific discussion of features and advantages set forth in the present description.

BRIEF DESCRIPTION OF THE DRAWINGS

The accompanying drawings are included to provide a further understanding of the compositions and methods of the disclosure, and are incorporated in and constitute a part of this specification. The drawings illustrate one or more embodiment(s) of the disclosure and, together with the description, serve to explain the principles and operation of the disclosure.

DETAILED DESCRIPTION OF THE DISCLOSURE

Figure 1A:
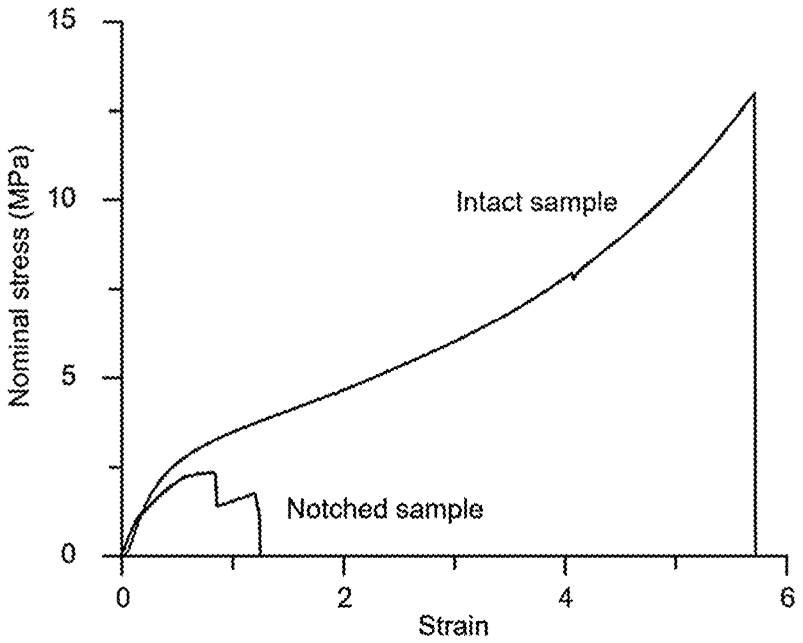
FIGS. 1A-1B provide the results of mechanical tests on the organogel according to one embodiment of the disclosure. (1A) Strain-stress curves of an intact and a notched organogel based on dodecyl PU-PCL of Example 3. (1B) Photos of the intact organogel based on dodecyl PU-PCL of Example 3 under tensile test.

Before the disclosed processes and materials are described, it is to be understood that the aspects described herein are not limited to specific embodiments, and as such can, of course, vary. It is also to be understood that the terminology used herein is for the purpose of describing particular aspects only and, unless specifically defined herein, is not intended to be limiting.

In view of the present disclosure, the methods and compositions described herein can be configured by the person of ordinary skill in the art to meet the desired need. The present disclosure provides tough organogels that provide improvements in anti-biofouling applications.

Thus, one aspect of the disclosure provides organogels including a polymer component that includes a modified polyurethane of the disclosure as described herein.

The modified polyurethane includes one or more lipophilic groups attached to the polyurethane at a carbamate moiety of the polyurethane. The one or more lipophilic groups, in certain embodiments, is attached to the polyurethane through a linker.

In general, the polyurethane of the disclosure is a polymer that has good toughness, stability, and biocompatibility in in vivo and in vitro applications.

The person of ordinary skill in the art will appreciate that a given polyurethane will often have a variety of molecular weights and structures in a given sample. Unless otherwise indicated, a "molecular weight" as used throughout is "weight-average" molecular weight, $M_w$. The $M_w$ can be determined using any known technique, such as light scattering, small angle neutron scattering, X-ray scattering, or sedimentation velocity. The structures provided herein represent a weight average structure over the sample of the polymers. The person of ordinary skill in the art will be able to distinguish between different polymers, as having substantially different average molecular weights, or substantially different structures. Thus, in some embodiments, the polyurethane has a $M_w$ of 500 Da to 50 kDa.

In certain embodiments, the polyurethane is a hydrophilic polyurethane. Examples of suitable ether-based hydrophilic polyurethanes include HydroMed™ D1, HydroMed™ D2, HydroMed™ D3, HydroMed™ D4, HydroMed™ D5, HydroMed™ D6, HydroMed™ D7, HydroMed™ D640 and HydroSlip™ C (all available from AdvanSource Biomaterials, Massachusetts, USA). Examples of suitable hydrophilic thermoplastic polyurethane includes HydroThane™ AL25 (available from AdvanSource Biomaterials, Massachusetts, USA).

In certain embodiments, the polyurethane is a hydrophobic polyurethane polyurethane. In certain embodiments, the polyurethane is an amphiphilic polyurethane. In certain other embodiments, the polyurethane is a block copolymer that contains urethane linkage (such as PU-PCL block copolymer).

The polyurethanes of the disclosure requires modification of lipophilic groups onto the backbones of polyurethane. For example, one or more lipophilic groups is introduced at the carbamate (urethane) moiety of the polyurethane. The lipophilic modification can be formed using various lipophilic alkyl and alkenyl chains or steroid derivatives. For example, in certain embodiments, the lipophilic group comprises $C_{10}$-$C_{24}$ alkyl, $C_{10}$-$C_{24}$ alkenyl, $C_{10}$-$C_{24}$ alkoyl, $C_{10}$-$C_{24}$ alkenoyl, or a steroid derivative.

In certain embodiments, the one or more lipophilic groups comprises lauryl, palmityl (cetyl), myristyl, stearyl, oleyl, lauroyl, palmitoyl (cetoyl), myristoyl, stearoyl, or oleoyl. In certain other embodiments, the one or more lipophilic groups comprises cholyl, deoxycholyl, or lithocholyl moiety.

The carbamates (urethanes) in the polyurethane can be modified with reactive groups such as isocyanates, isothiocyanates, and sulfonyl chlorides. For example, the polyurethanes can be modified with diisocyanates, diisothiocyanates, or sulfonyl chlorides (such as methylene diphenyl diisocyanate (MDI), toluene diisocyanate (TDI), 1,6-hexane diisocyanate (HDI), 1,4-butane diisothiocyanate, 1,3-propylene diisothiocyanate, p-phenylene diisothiocyanate, etc.) to introduce the linker moieties into the polyurethanes. These remaining reactive groups on the diisocyanates, diisothiocyanates, or sulfonyl chlorides can further react with functional monomers or functional polymers having the hydroxy, amine, thiol, or carboxyl moiety. For example, the remaining reactive groups may react with fatty acids, fatty alcohols, fatty amines, and fatty thiols to provide the modified polyurethanes of the disclosure comprising one or more lipophilic groups. Alternatively, the remaining reactive groups may react with other functional monomers (such as N,N-dimethylacetamide, N-isopropyl acrylamide, methyl methacrylate, etc.) to provide longer linkers or linkers that are configured to attach at least two or more lipophilic groups.

In certain embodiments, the linker is of formula:

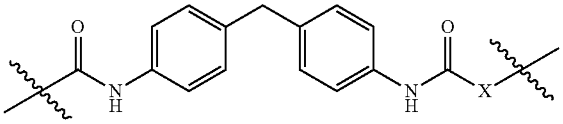
,
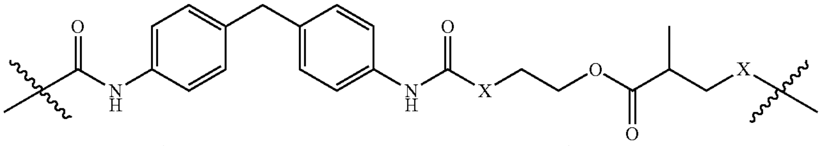
,
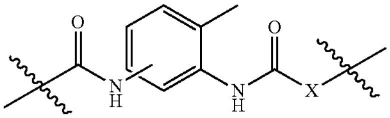
,
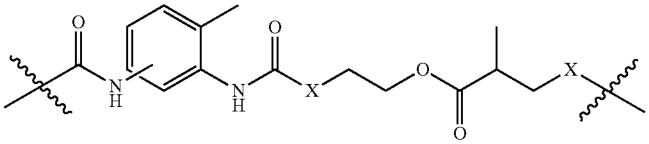
,
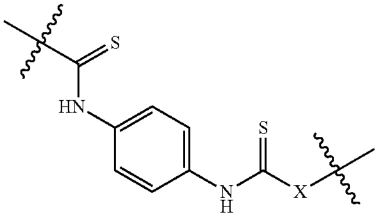
,
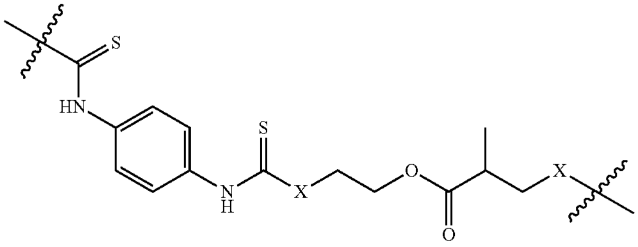
,
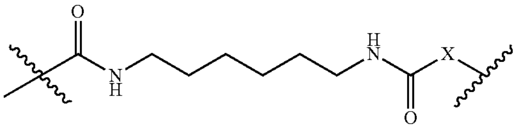
,
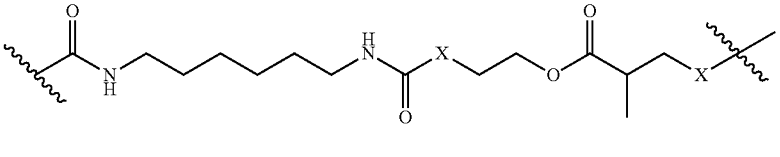
, -continued

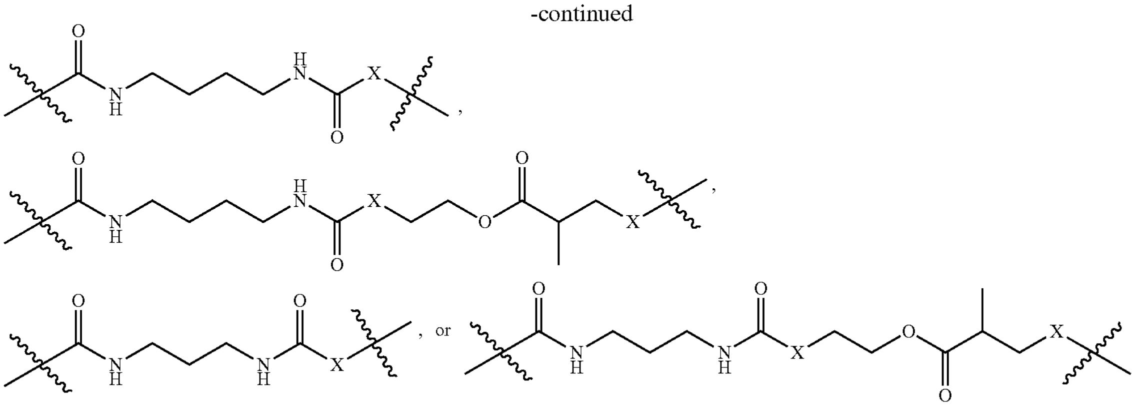

where X is —O—, —S—, or —NH—. In certain embodiments, X is —O—. In certain embodiments, one X is —O—, and the other X is —S—.

The methods of preparation of the modified polyurethanes of the disclosure can be widely applied to various commercially available polyurethanes, under melting or dissolving conditions, using procedures familiar to the person of ordinary skill in the art and as described herein. Many general references providing commonly known chemical synthetic schemes and conditions useful for synthesizing the disclosed modified polyurethanes are available. For example, the modified polyurethanes of the disclosure can be prepared according to general Scheme 1, Examples 1-6, and/or analogous synthetic procedures. One of skill in the art can adapt the reactants and reagents, reaction sequences and general procedures in the examples to fit the desired target molecule. Of course, in certain situations one of skill in the art will use different reactants and reagents to affect one or more of the individual steps or to use protected versions of certain of the substituents. Additionally, one skilled in the art would recognize that compositions of the disclosure can be synthesized using different routes altogether. During any of the processes for preparation of the modified polyurethanes of the disclosure, it may be necessary and/or desirable to protect sensitive or reactive groups on any of the molecules concerned. This may be achieved by means of conventional protecting groups as described in standard works. The protecting groups may be removed at a convenient subsequent stage using methods known from the art.

Scheme 1

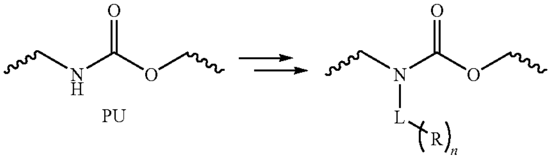

PU lipophilic PU wherein L is a linker, R is a lipophilic group, and n is 1-10000.

The organogels of the disclosure as described herein can be prepared from the modified polyurethanes and organic solvent. For example, the modified polyurethanes are mixed with the organic solvent and are subjected to conventional plastic molding methods such as injection molding, extrusion molding, deposition molding, filament molding, and hot-calendaring press molding, to form the organogels.

In certain embodiments, the organic solvent is present in an amount of at least about 10 wt %, or at least about 25 wt %, or at least about 50 wt %, based on total weight of the organogel. In certain embodiments, the organic solvent is present in a range of about 10 wt % to about 80 wt %, based on total weight of the organogel.

Many organic solvents are known in the art. In certain embodiments, organic solvent is a synthetic oil or natural oil, such as cooking oil or vegetable oil. In an example embodiment, the organic solvent is cottonseed oil, avocado oil, canola oil, grapeseed oil, or lavender oil.

The organogels of the disclosure as described herein are considered tough organogels. Such organogels, in certain embodiments, have interfacial toughness of at least 100 J $m^{-2}$, or at least 150 J $m^{-2}$, or at least 200 J $m^{-2}$, or at least 500 J $m^{-2}$, or in the range of 700 to 1500 J $m^{-2}$, in fully swollen state as measured by, for example, ASTM D 2861 standard 90-degree peeling test.

In certain embodiments, the organogels have a young's modulus values of at least 2.5 MPa, or at least 4 MPa, or at least 5 MPa, or at least 10 MPa, as determined by ASTM F2258 tensile test. In certain embodiments, the organogels have rupture stretch value (A) in the range of 2 to 25, or 2 to 15, or 2 to 10, or 4 to 25, or 4 to 15, or 4 to 10, or 5 to 8, as determined by ASTM F2258 tensile test. In certain embodiments, the organogels have fracture toughness in the range of 2 to 20 $kJ/m^2$, as determined by ASTM E1820 tensile test.

Tough organogels can be used as an antifouling coating for biomedical devices. For example, lipophilic organogels can form strong adhesion with various substrates, such as glass and plastic, due to the strong hydrogen bonding between organogels and substrates. Thus, in certain embodiments, the disclosure also provides a coating comprising the organogel of the disclosure. The coating may be used in coating surfaces of a medical device or sensor, microfluidic device, optoelectronic device, etc., for example to prevent, inhibit, or reduce biofouling. One aspect of the disclosure provides a method of preventing, inhibiting, or reducing biofouling in a medical device or sensor, comprising applying the coating of the disclosure to the surface of the medical device or sensor.

The coating may be prepared by applying the dissolved polyurethane of the disclosure onto the desired surface, and fully drying the polyurethane. The dried polyurethane is then placed in oil to form an antifouling organogel coating.

In another embodiment, the coating may be prepared by applying the organogel of the disclosure to the desired surface, and fully drying the organogel to form an antifouling organogel coating.

Another aspect of the disclosure provides a medical device, sensor, microfluidic device, or optoelectronic device that comprise a coating of the disclosure as described herein.

EXAMPLES

The methods and compositions of the disclosure are illustrated further by the following example, which is not to be construed as limiting the disclosure in scope or spirit to the specific procedures and compounds described in them.

Example 1. Preparation of the Lipophilic Polyurethane of the Disclosure

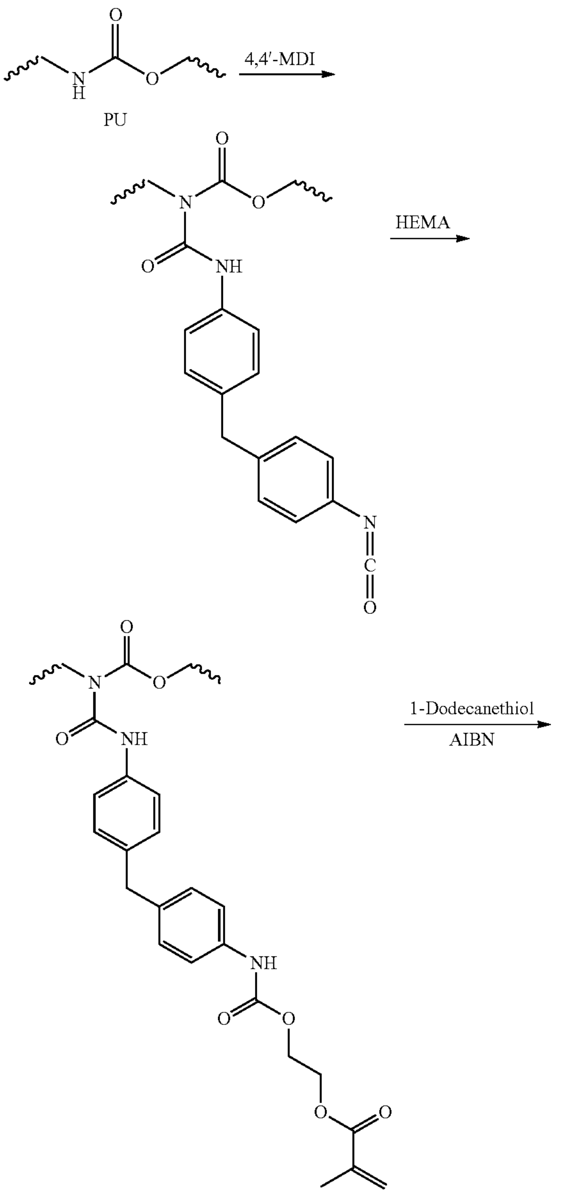

-continued

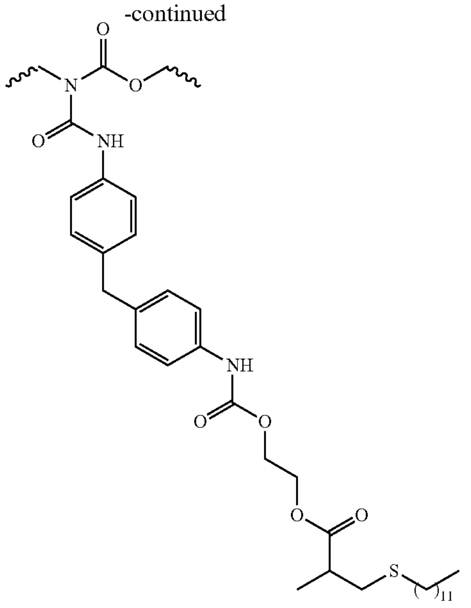

HydroMed™ D640 PU (3 g; available from AdvanSource Biomaterials, Wilmington, MA) was dissolved in anhydrous N,N-dimethylformamide (DMF) (20 mL) in a three-neck flask equipped with a mechanical stirrer under a nitrogen atmosphere. Then, 4,4'-methylenebis(phenyl isocyanate) (4,4'-MDI) (0.2 g; available from Sigma-Aldrich, Inc., St. Louis, MO) was added to the polyurethane solution and stirred for 40 min at 50° C. Next, 2-hydroxyethyl methacrylate (HEMA) (0.3 mL; Sigma-Aldrich, Inc.) was added to the reaction mixture, and the reaction was carried out for one additional hour. 1-Dodecanethiol (2 mL; Sigma-Aldrich, Inc.) and 2,2'-azobis(2-methylpropionitrile) (AIBN) (30 mg; Sigma-Aldrich, Inc.) were subsequently added. The reaction was continued for 3 hours at 70° under mechanical stir. When the reaction was completed, the product was precipitated in ethanol (1.5 L) to terminate the reaction. The product was cut into pieces and thoroughly washed with distilled water and ethanol under magnetic stirring to remove any remaining reactants. The final product was filtered and dried at 65° C. for one day to obtain the lipophilic polyurethane of the disclosure, (4-(4-(((2-((3-(dodecylthio)-2-methylpropanoyl)oxy)ethoxy) carbonyl) amino)benzyl)phenyl)carbamoyl-modified PU (dodecyl PU-D640).

Example 2. Preparation of the Dodecyl PU-D3

Using the procedure disclosed in Example 1, similar modification was carried out using HydroMed™ D3 PU (available from AdvanSource Biomaterials, Wilmington, MA) to obtain (4-(4-(((2-((3-(dodecylthio)-2-methylpropanoyl)oxy)ethoxy)carbonyl)amino)benzyl) phenyl)carbamoyl-modified PU (dodecyl PU-D3).

Example 3. Preparation of the Dodecyl PU-PCL

Using the procedure disclosed in Example 1, similar modification was carried out using MDI-polyester/polyether polyurethane (PU-PCL, poly[4,4'-methylenebis(phenyl isocyanate)-alt-1,4-butanediol/di(propylene glycol)/polycaprolactone], CAS Number: 68084-39-9, purchased from Sigma-Aldrich product Number 430218 to obtain (4-(4-(((2-((3-

(dodecylthio)-2-methylpropanoyl)oxy)ethoxy)carbonyl) amino)benzyl) phenyl)carbamoyl-modified PU (dodecyl PU-PCL).

Example 4. Preparation of the Lipophilic Polyurethane of the Disclosure

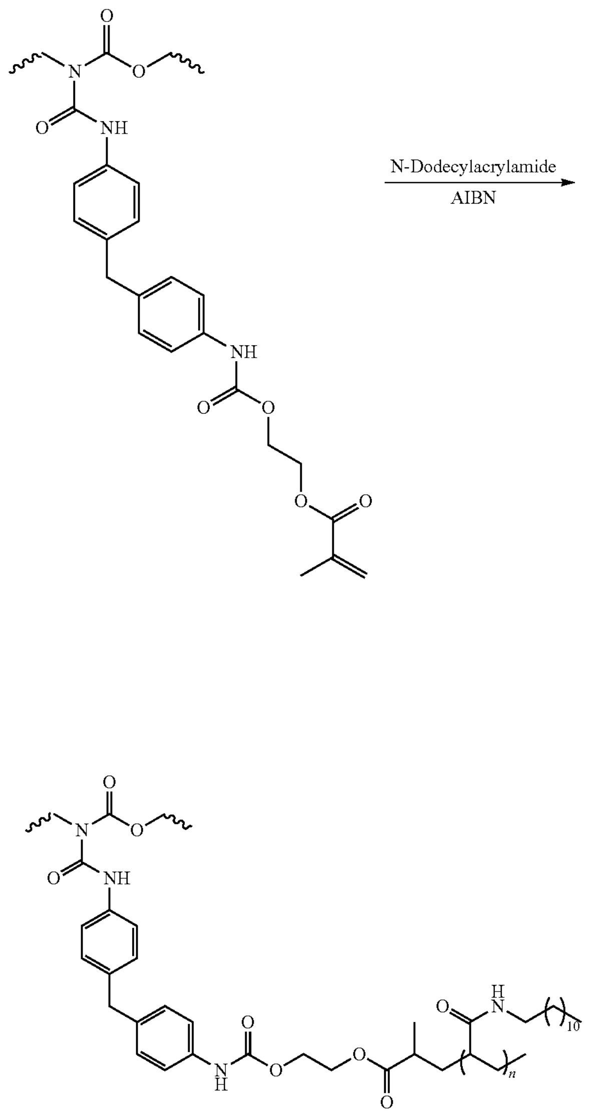

where n is 1-10000

This PU was modified using the procedure in Example 1. In short, PU was dissolved in anhydrous DMF in a three-neck flask equipped with a mechanical stirrer under a nitrogen atmosphere. Then, 4,4'-MDI was added to the polyurethane solution and stirred for 40 min at 50° C. Next, HEMA was added to the reaction mixture, and the reaction was carried out for one additional hour. Finally, N-dodecylacrylamide and AIBN were subsequently added, and the reaction was continued for 3 hours at 70° under mechanical stir. When the reaction was completed, the product was worked up as noted.

Example 5. Preparation of the Lipophilic Polyurethane of the Disclosure

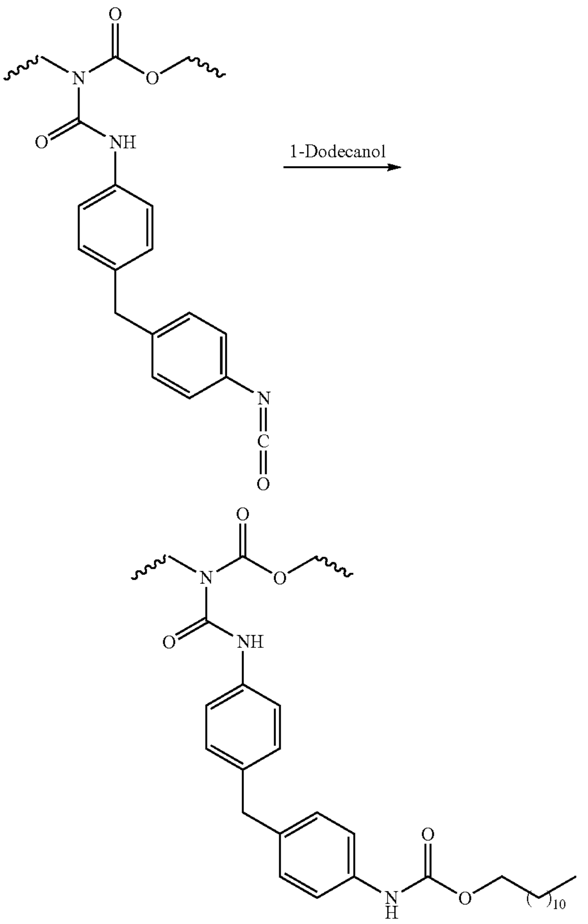

PU was dissolved in anhydrous DMF in a three-neck flask equipped with a mechanical stirrer under a nitrogen atmosphere. Then, 4,4'-MDI was added to the polyurethane solution and stirred for 40 min at 50° C. Next, 1-dodecanol was added to the reaction mixture, and the reaction was carried out to completion.

Example 6. Preparation of the Lipophilic Polyurethane of the Disclosure

PU was dissolved in anhydrous DMF in a three-neck flask equipped with a mechanical stirrer under a nitrogen atmosphere. Then, 4,4'-MDI was added to the polyurethane solution and stirred for 40 min at 50° C. Next, lauric acid was added to the reaction mixture, and the reaction was carried out to completion.

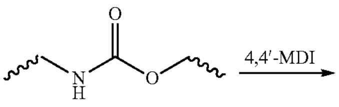

PU

-continued

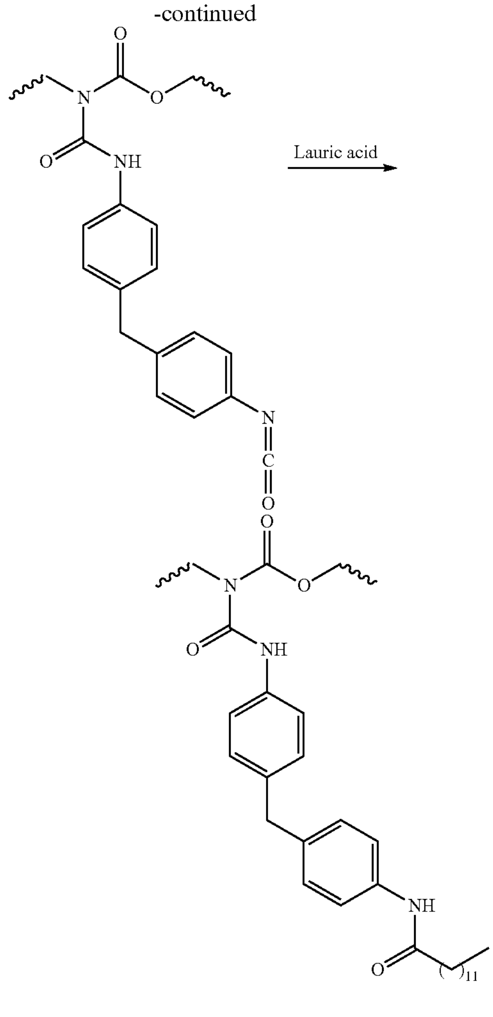

Example 7. Preparation of the Lipophilic Polyurethane Organogels of the Disclosure The lipophilic polyurethanes of the disclosure are immersed in vegetable oil (or another organic solvent or oils) to form the organogels of the disclosure. For example, the dried polyurethanes obtained in Examples 1-6 were immersed in cottonseed oil for eight hours to prepare their respective organogels.

Example 8. Physical Evaluation of the Organogels of the Disclosure

Swelling test: To measure weight and volume change of the organogels of the disclosure, the "dry" lipophilic polyurethane samples without any solvent were immersed in vegetable oil for eight hours to form organogels. Optionally, Nile red dye (9-(diethylamino)-5H-benzo[a]phenoxazine-5-one), or another lipophilic dye, is included in the vegetable oil as described in Example 7 in order to conveniently visualize of the swelling. The weight and volume change of the materials of the disclosure in cottonseed oil are provided in Table 1. The swelling ratio is provided as % change in weight of the PU material before and after immersion in oil (e.g., increase in wt % indicates the PU material absorbs the oil and forms the organogel.)

TABLE 1

Swelling test results of the organogels of the disclosure

| PU Material | Swelling ratio (wt %) |
| --- | --- |
| PU-D3* | 100 |
| dodecyl PU-D3 (Ex. 2) | 110 |
| PU-PCL ** | 100 |
| dodecyl PU-PCL (Ex. 3) | 300 |

*unmodified, HydroMed™ D3 PU;
**unmodified PU-PCL

The results in this table illustrate that, for example, 1 g of dodecyl PU-PCL can absorb 2 g cottonseed oil, while 1 g of dodecyl PU-D3 can absorb 0.1 g cottonseed oil.

Figure 1B:
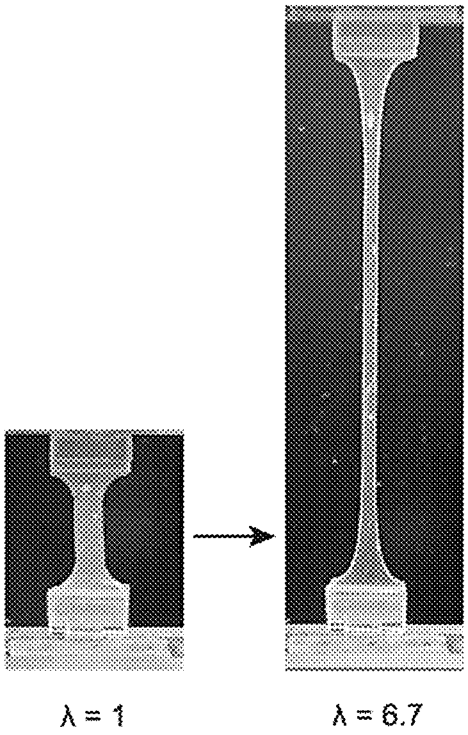

Mechanical test: The mechanical properties of the organogels of the disclosure were tested by standard tensile tests (ASTM F2258) and fracture energy test (ASTM E1820). FIGS. 1A and 1B provide the results of mechanical testing on organogel obtained by immersing dodecyl PU-PCL (Ex. 3) in cotton seed oil for 8 hours. Dodecyl PU-PCL organogel is very elastic ($\lambda$=6.7) and shows a high Young's modulus (5.5 MPa) in the tensile test.

Example 9. Biofouling Evaluation of the Organogels of the Disclosure

Figure 2:
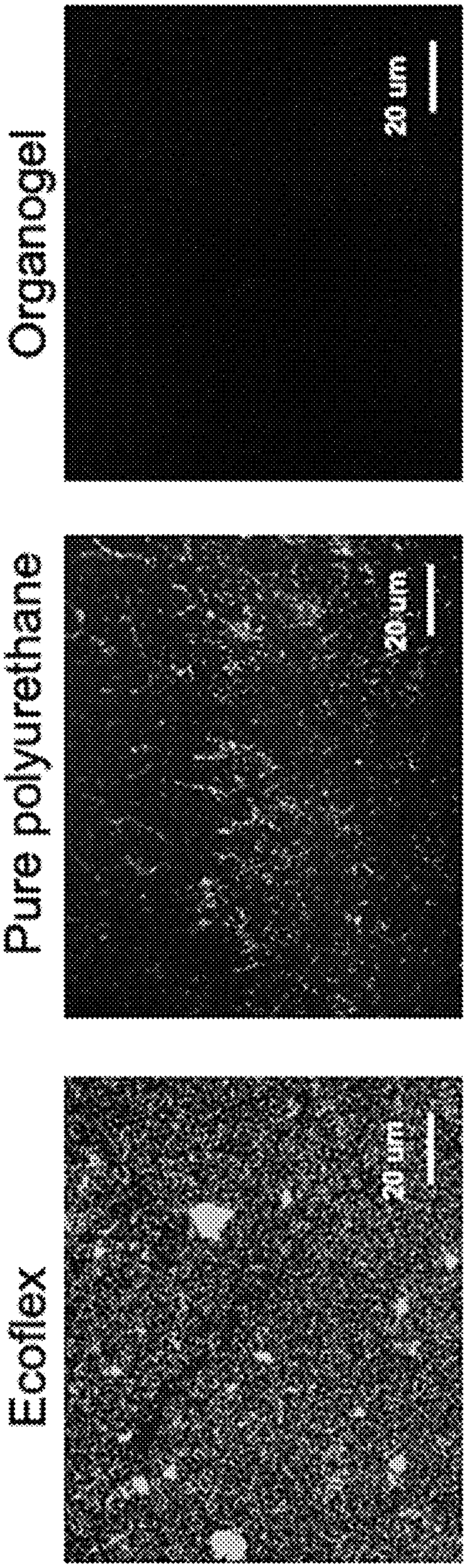
FIG. 2 provides the results of bacterial adhesion characterization of organogel according to one embodiment of the disclosure.

Bacterial adhesion characterization: an engineered *Escherichia coli* (*E. coli*) strain that constitutively expresses green fluorescent protein (GFP) was prepared by the previously reported protocol and cultured in Luria-Bertani broth (LB broth) overnight at 37° C. 1 μL of bacteria culture diluted in 1 mL of fresh LB broth was placed on Ecoflex™ control samples, unmodified pure PU control samples and dodecyl PU-PCL organogel samples (1 cm×1 cm) and incubated for 24 h at 37° C. After incubation, the organogel samples were taken out and rinsed with phosphate buffered saline (PBS) to remove the free-floating bacteria, and imaged with a fluorescence microscope (Eclipse LV100ND, Nikon). The number of adhered *E. coli* on the samples per unit area ($mm^2$) were counted by Image J. The bacterial adhesion characterization of organogel based on dodecyl PU-PCL (Ex. 3) are provided in FIG. 2.

Figure 3:
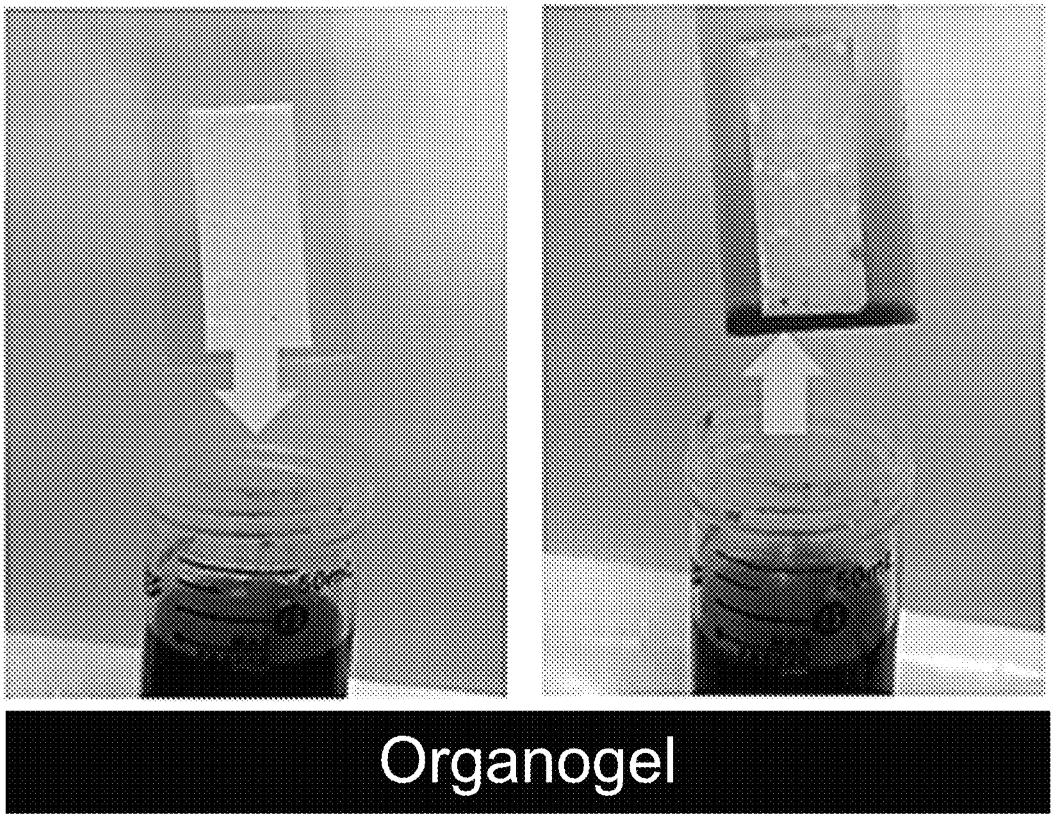
FIG. 3 provides the results of fibrin deposition characterization of the organogel according to one embodiment of the disclosure.

Fibrin deposition characterization: a 5 v/v % solution of fetal bovine serum (FBS) in PBS used to block the wells of a 24-well plate for 30 min. The wells were rinsed with PBS, then 6 mm-diameter organogel samples were placed in the blocked wells. The organogel samples were submerged in porcine blood spiked with Alexa Fluor® 488-labeled human fibrinogen conjugate (66 μg fibrinogen mL-1 blood, Thermo Fisher) and incubated on a shaker in 220 rpm at room temperature for 60 min. The organogel samples were gently rinsed in PBS and fixed for 1 hr in 2.5 v/v % glutaraldehyde in 0.1 M phosphate buffer. The organogel samples were then imaged with a fluorescence microscope (Eclipse LV100ND, Nikon) and analyzed using ImageJ. The fibrin deposition characterization of organogel based on dodecyl PU-PCL (Ex. 3) are provided in FIG. 3.

It is understood that the examples and embodiments described herein are for illustrative purposes only and that various modifications or changes in light thereof will be suggested to persons skilled in the art and are to be incorporated within the spirit and purview of this application and scope of the appended claims. All publications, patents, and patent applications cited herein are hereby incorporated herein by reference for all purposes.

What is claimed is:

1. A modified polyurethane comprising one or more lipophilic groups attached to the polyurethane, through a linker, at a carbamate moiety of the polyurethane.

2. The modified polyurethane of claim 1, wherein the polyurethane is a hydrophilic polyurethane, an amphiphilic polyurethane or a hydrophobic polyurethane.

3. The modified polyurethane of claim 2, wherein the hydrophilic polyurethane is an ether-based hydrophilic polyurethane or a hydrophilic thermoplastic polyurethane elastomer.

4. The modified polyurethane of claim 1, wherein the polyurethane is a block copolymer that contains a urethane linkage.

5. The modified polyurethane of claim 1, wherein the one or more lipophilic groups comprises $C_{10}$-$C_{24}$ alkyl, $C_{10}$-$C_{24}$ alkenyl, $C_{10}$-$C_{24}$ alkoyl, $C_{10}$-$C_{24}$ alkenoyl, or a steroid derivative.

6. The modified polyurethane of claim 1, wherein the one or more lipophilic groups comprises a lauryl, palmityl (cetyl), myristyl, stearyl, oleyl, lauroyl, palmitoyl (cetoyl), myristoyl, stearoyl, oleoyl, cholyl, deoxycholyl, or lithocholyl moiety.

7. The modified polyurethane of claim 1, wherein the linker is derived from diisocyanates, diisothiocyanates, or sulfonyl chlorides.

8. The modified polyurethane of claim 1, wherein the linker is of formula:

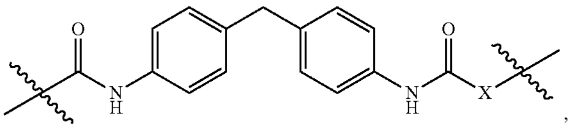
,
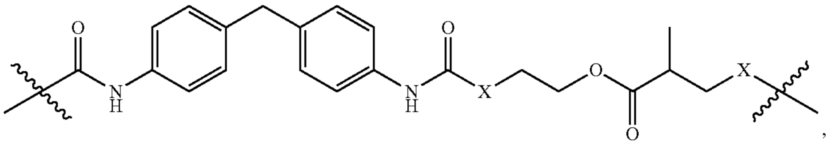
,
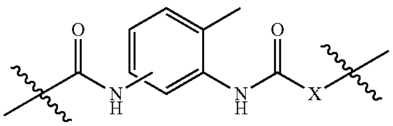
,
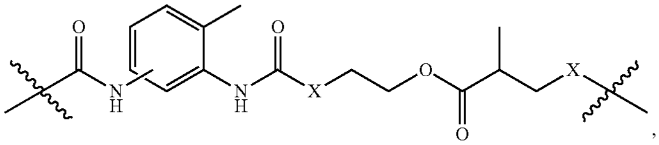
,
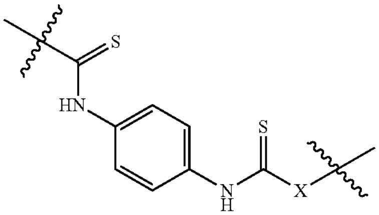
,
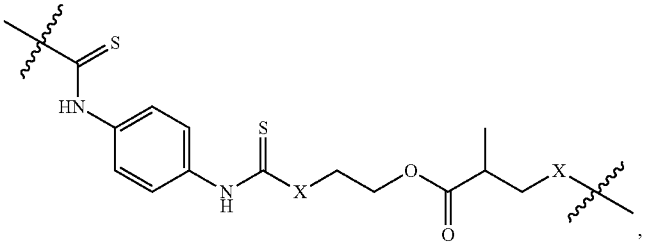
,
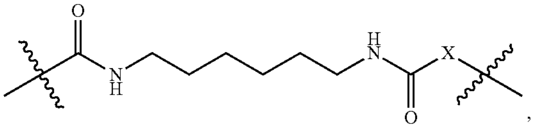
,
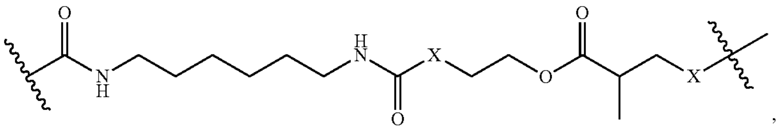
,
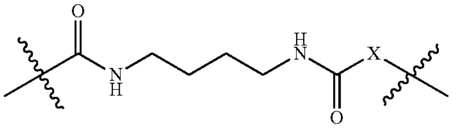
,
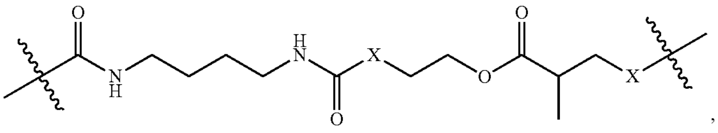
,
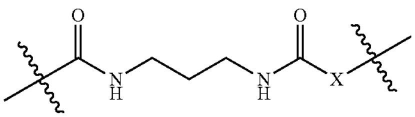
, or
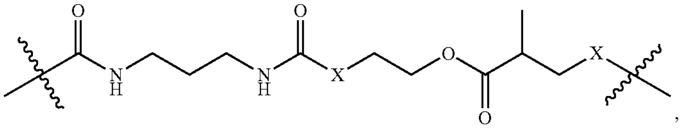
, where X is —O—, —S—, or —NH—.

9. The modified polyurethane of claim 1, wherein the linker is configured to attach one lipophilic group.

10. The modified polyurethane of claim 1, wherein the linker is configured to attach 1 to 10000 lipophilic groups.

11. The modified polyurethane of claim 1 having a $M_w$ of 500 Da to 50 kDa.

12. An organogel comprising a polymer component comprising a modified polyurethane of claim 1 and an organic solvent.

13. The organogel of claim 12, wherein the organic solvent is present in an amount of at least about 10 wt % based on total weight of the organogel.

14. The organogel of claim 12, wherein the organic solvent is a synthetic oil or natural oil.

15. The organogel of claim 12, having a young's modulus values of at least 2.5 MPa as determined by ASTM F2258 tensile test.

16. The organogel of claim 12, having interfacial toughness of at least 100 J $m^{-2}$ in fully swollen state as determined by ASTM D 2861 standard 90-degree peeling test.

17. The organogel of claim 12, having rupture stretch value (λ) in the range of 2 to 25 as determined by ASTM F2258 tensile test.

18. The organogel of claim 12, having fracture toughness in the range of 2 to 20 kJ/$m^2$, as determined by ASTM E1820 tensile test.

19. A coating comprising an organogel of claim 12.

20. A method of preventing, inhibiting, or reducing biofouling in a medical device or sensor, comprising applying a coating of claim 19 to the surface of the medical device or sensor.

21. The method of claim 20, wherein the coating reduces biofouling by greater than 50% in vivo or after storage in phosphate buffered saline (PBS), media, or serum at 37° C., optionally for a period of at least 1 day compared to the device or sensor without the coating.

22. A medical device or sensor comprising a coating of claim 19.

* * * * *